United States Patent [19]
Yaple

[11] 3,738,207
[45] June 12, 1973

[54] TEMPLATE CONTROLLED TOOL FEED FOR MACHINE TOOLS

[75] Inventor: Winfred E. Yaple, Albuquerque, N. Mex.

[73] Assignee: Continental Machining Co. Inc., Albuquerque, N. Mex.

[22] Filed: Nov. 15, 1971

[21] Appl. No.: 198,846

[52] U.S. Cl. .......................................... 82/14 R
[51] Int. Cl. ............................................ B23b 3/28
[58] Field of Search .............................. 82/11, 14

[56] References Cited
UNITED STATES PATENTS

| | | | |
|---|---|---|---|
| 3,267,777 | 8/1966 | Cordier | 82/14 R |
| 3,272,039 | 9/1966 | Weaver | 82/14 R |
| 2,782,668 | 2/1957 | Richet | 82/14 R |
| 3,307,439 | 3/1967 | Aregger | 82/14 R |
| 3,520,216 | 7/1970 | Jeanneret | 82/14 R |

Primary Examiner—Harrison L. Hinson
Attorney—Austin A. Webb

[57] ABSTRACT

A driven work holder rotates the work about an axis with a fixed template in spaced parallel relation to the axis and with an edge contoured transversely to the axis to the desired shape of the finished work. A tool feed base mounted to advance parallel to the axis of the work has spaced slideways on opposite sides of the axis inclined outwardly away from the work. A yoke shaped tool holding member is slidable on the inclined ways and carries a cutting tool bridged across its front end. A template support on the tool feed base engages a straight lower edge on the template, while a follower on the tool holding member engages the opposite contoured edge of the template. A yieldable connection between the feed base and the tool holding member holds the two parts in fixed relation with a uniform tool feeding pressure until engagement of the follower with a non-linear contour on the template causes the holding member to slide up along the inclined ways, and move the tool transversely away from the work axis to a new working radius.

9 Claims, 5 Drawing Figures

PATENTED JUN 12 1973 3,738,207

INVENTOR.
WINFRED E. YAPLE
BY
ATTORNEY.

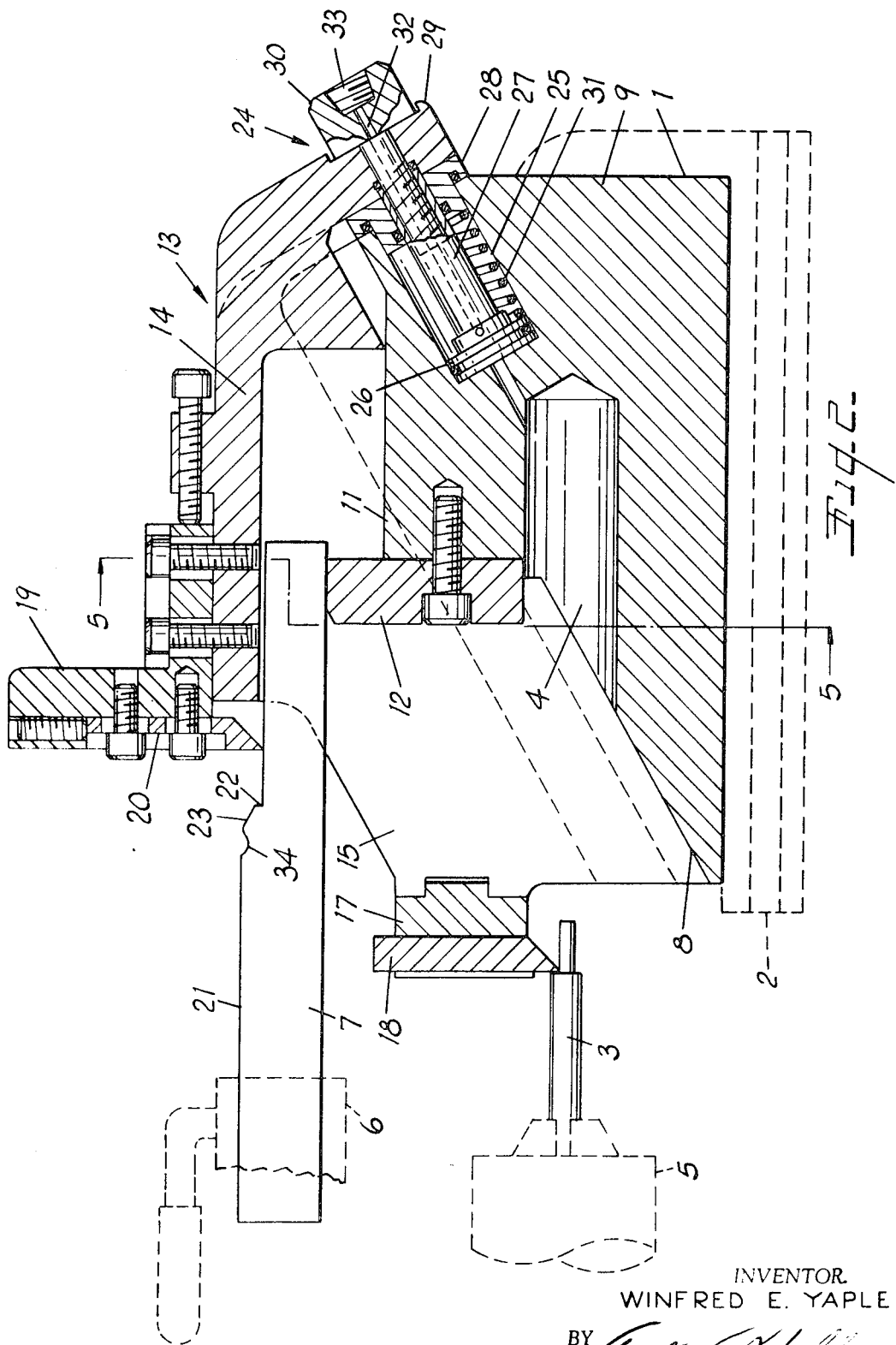

PATENTED JUN 12 1973 3,738,207

INVENTOR.
WINFRED E. YAPLE
BY Austin A. Webb
ATTORNEY

TEMPLATE CONTROLLED TOOL FEED FOR MACHINE TOOLS

OUTLINE OF INVENTION

There have been numerous template controlled tool holders for copying lathes. However, these have been relatively complicated by remote mounting of the template to be followed, and by complex servo-drives and sensors. The present invention lies in the simplicity of a fixed template located closely adjacent the work axis, and the mechanical accuracy with which the tool holder and follower are caused to coact with the template in response to simple rectilinear feed motion of the machine. The mechanism is adaptable to fixed bed lathes, or to more complex turret type machines.

The drawings, of which there are three sheets, show a preferred form of the tool holder, tool feed and template follower as applied to a single position rotatable work holder.

FIG. 2 is a vertical longitudinal cross sectional view taken along the plane of the line 2—2 in FIG. 1.

Figure 1:
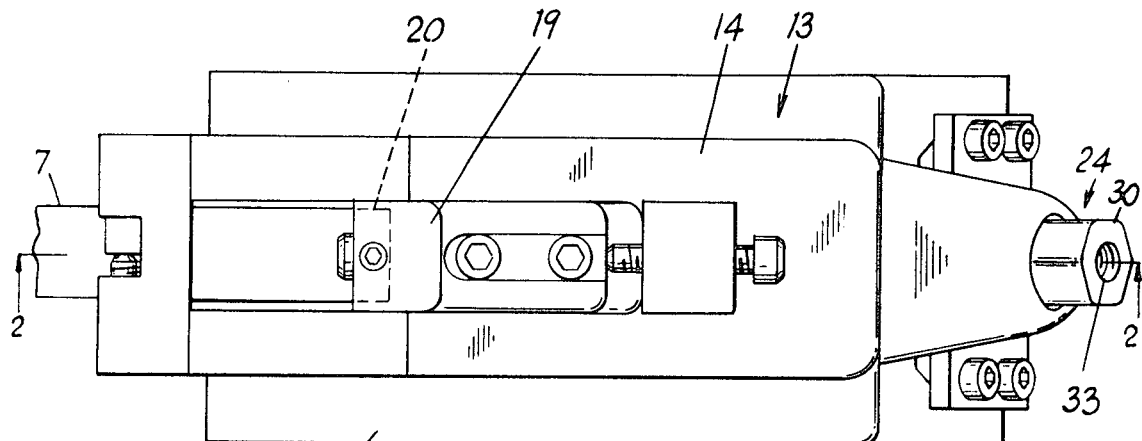
FIG. 1 is a top plan view of the tool holder and follower mechanism.
Figure 3:
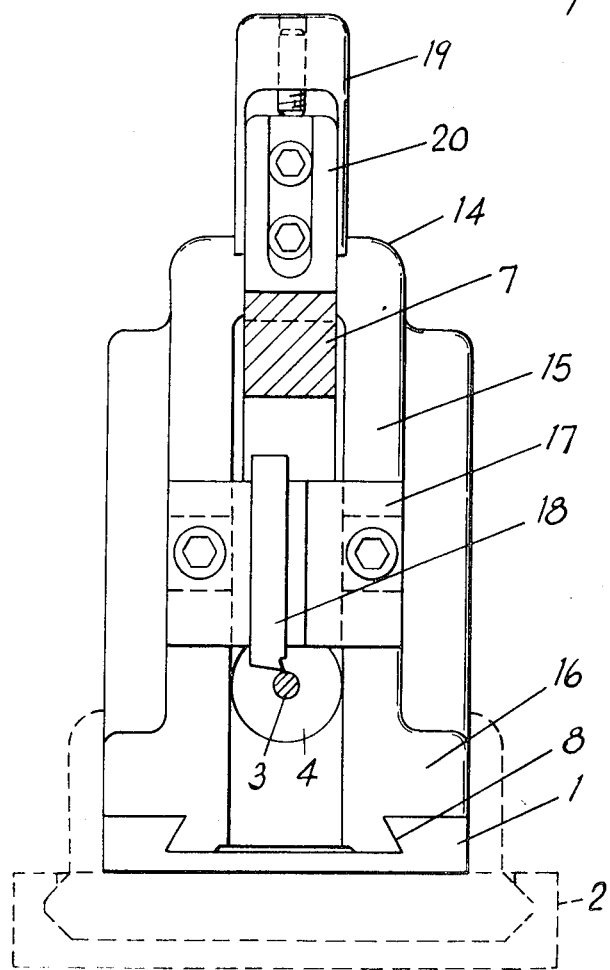
FIG. 3 is a left elevational view of the holder and follower.

The tool holder base 1 is mounted upon a tool feed member indicated by the dotted line at 2. The feed member, being part of the machine tool proper, may vary from machine to machine and so is not shown in greater detail. The base is moved axially toward the work indicated at 3 by manual or automatic motion of the machine, and the base is provided with a recess 4 coaxial with the work to receive the end of the work to extend the operable range of the attachment. The work is held and rotated about its axis by a chuck 5 of the machine, also shown by dotted lines. Removably connected to a fixed part of the frame 6 of the machine is a pattern bar or template 7 which projects in parallel relation over the work axis.

Figure 4:
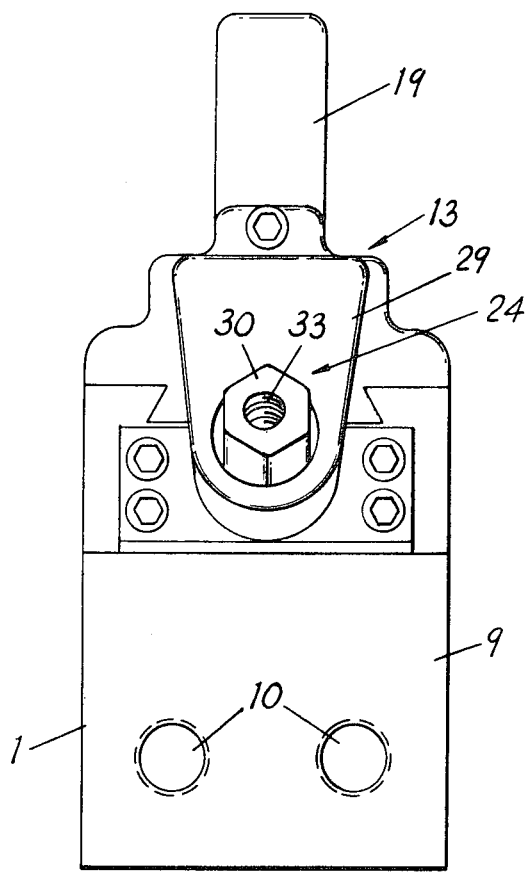
FIG. 4 is a right or rear elevational view of the holder and follower.
Figure 5:
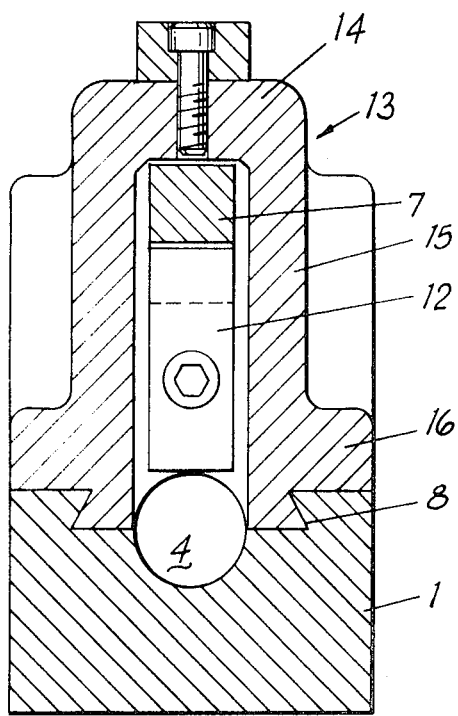
FIG. 5 is a vertical transverse cross sectional view taken along the plane of the line 5—5 in FIG. 4.

The holder base 1 is formed with spaced dovetail slideways 8 which incline upwardly and rearwardly along each side of the base at an acute angle of about 30° with the horizontal. The specific angle can be varied. An upstanding column 9 on the outer or rear end of the base receives connecting screws from the tool feed member 2 in the holes 10 (see FIG. 4), and has a forwardly projecting shoulder 11 located between the slides, to which a template support shoe 12 is removably secured. The shoe is selected to engage the bottom straight edge of the template 7 in sliding relation. The template is thus firmly supported during all parts of the travel of the tool.

Slidably supported on the slideways 8 is a yoke shaped stylus or movable tool holder indicated generally at 13. The holder includes a top wall 14 and triangular side walls 15 with slides 16 on their lower edges mating with the slideway 8. At the front or inner ends of the side walls is a removable cross bar 17 which acts as a holder for the cutting tool 18. The top wall 14 carries an adjustable angle bracket 19 which in turn carries a vertically adjustable template follower 20. The follower rides on the contoured upper edge 21 of the template, and as the follower engages non-linear contours such as the shoulder 22 or incline 23, the resistance to feeding motion of the follower causes the stylus 13 to move upwardly along the inclined slideways 8 until the position of the tool is adjusted to the desired level as indicated by the contoured edge 21. More accurately, the feeding motion of the feed member 2 and base holder 1 continues under the yoke, while the tool remains stationary or advances at a decreased rate.

In order to provide the necessary cutting pressure on the tool 18, the yoke 13 is urged forwardly and downwardly on the inclined slideways by a yieldable pressure mechanism indicated generally at 24. An inclined bore 25 in the post 9 at the back of the base receives a piston 26 parallel to the slideways. The rod 27 of the piston passes in sealing relation through a cover plate 28 and is anchored to an ear 29 on the yoke as by a headed screw 30. The piston is continually urged downwardly into the bore, either by a spring 31, or by air pressure admitted to the bore through passages 32 in the screw and piston rod from a supply connection 33 in the head of the screw. If desired, both the spring and air pressure may be employed. If air pressure alone is employed, it may be cut off on automatic machines to relieve cutting pressure on the tool during retraction of the tool. This will relieve pressure of the follower on the contoured template edge 21, and preserve the accuracy of the edge. Air pressure also has the advantage of maintaining uniform cutting pressure on the tool as the stylus moves back up the slideways.

The tool feed will cause the tool to accurately reproduce the shape of the template, including 90° shoulders such as 22, inclines 23 and a reentrant curve such as 34. The accuracy of the reproduction, without chatter or deflection, is due in large part to the positioning of the contact point of the follower 20 in a vertical plane through the template and the axis of the work piece and the direction of advance of the tool 18. Since the inclined slideways 8 are located on opposite sides of this plane and partially below the work axis, all forces applied by the template to the follower are in this central plane and do not cause deflection. In addition, the template is supported by the support 12 in this same plane to assure that the follower engages the template smoothly and accurately.

What is claimed as new is:

1. A pattern following tool holder for a machine tool having means for securing a template bar in spaced parallel relation to a work holding chuck comprising,
   a base member adapted to be secured to a tool feed of the machine tool for advance toward said chuck and parallel with the axis thereof,
   spaced parallel slides on said base member on opposite sides of said axis forming a slideway inclined outwardly at an acute angle relative to said axis,
   a movable tool holder having spaced sidewalls slidable on said slideway and having a cross member connected between the fronts of said sidewalls and shaped for holding a tool in operative relation to work in said chuck and said bar,
   a bar support on said holder engageable with one side of said bar,
   a tongue on said base member projecting between said sidewalls and supporting said bar support,
   a template follower on said holder engageable with a contoured side on said bar opposite to said bar support, and pressure means coacting between said holder and said base and acting to bias said holder and a tool carried thereby toward said axis.

2. A tool holder as defined in claim 1 in which said coacting pressure means comprises
a bore formed in said base parallel to said slideways,
a piston and piston rod reciprocable in said bore,
an ear connecting the outer ends of said sidewalls across the end of said bore and having the outer end of said piston rod anchored thereto,
and means for biasing said piston inwardly of said bore.

3. A tool holder as defined in claim 2 in which said biasing means comprises a spring compressed in said bore between the outer end of said piston and a stop at the outer end of the bore.

4. A tool holder as defined in claim 2 in which said biasing means comprises
seal means sealing the outer end of said bore and slidably sealed to said piston rod,
and pressure passages formed through said piston rod from the outer end of the rod to within said bore and adapted to be connected to a source of air pressure.

5. A tool holder as defined in claim 1 in which said base has an inwardly opening recess on its inner face coaxial with the axis of said chuck and projecting outwardly beyond said bar support on said tongue.

6. In a machine tool having a work holding chuck, a template controlled tool feed assembly comprising,
a base member adapted to be advanced along the axis of the chuck and having spaced parallel slideways on opposite sides of the axis of the chuck and in planes parallel to the axis of the chuck,
said slideways being inclined upwardly from the leading end of said base member,
a movable tool holder having spaced sides connected by an upper cross part,
said sides having slides on their lower edges coacting with said slideways,
a template follower adjustably mounted on the cross part of said tool holder with the working surface of the follower projecting below the cross part,
a template support rigidly connected to said base member between said slideways and located rearwardly of the leading ends of said slideways and spaced substantially below the cross part of said tool holder to support the lower edge of a template having its upper edge engaged with said template follower,
means connected to and carried by the spaced sides of said tool holder to support a cutting tool adjacent the axis of said chuck and in forwardly spaced relation to said template support,
a pressure member rigidly connected to the rear of said holder between the sides thereof and inclined forwardly and downwardly parallel to the slides thereon,
said base member having a recess in its rear end slidably and guidingly receiving said pressure member,
and means for applying yieldable pressure between said pressure member and directed downwardly on the pressure member.

7. A tool feed and assembly as defined in claim 6 in which said means for applying pressure comprises means for delivering and retaining air pressure in said recess and against said pressure member.

8. A tool feed and assembly as defined in claim 6 in which said means for applying pressure comprises a spring compressible between said base member and the rear of said pressure member.

9. A tool feed and assembly as defined in claim 6 in the working portions of a cutting tool carried by said means to support the tool, said template support, said template follower, and the axis of said pressure member are all disposed in a common plane passed through the axis of the chuck.

* * * * *